(12) United States Patent
Nuang

(10) Patent No.: US 6,226,427 B1
(45) Date of Patent: *May 1, 2001

(54) OPTICAL ISOLATOR

(75) Inventor: Yidong Nuang, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/302,414

(22) Filed: Apr. 30, 1999

Related U.S. Application Data

(62) Division of application No. 08/848,558, filed on Apr. 28, 1997, now Pat. No. 5,991,481.

(30) Foreign Application Priority Data

Apr. 30, 1996 (JP) .................................. 8-109062

(51) Int. Cl.$^7$ ........................................ G02B 6/34
(52) U.S. Cl. ................ 385/40; 385/7; 385/37; 359/285; 359/237
(58) Field of Search .................. 385/40, 2, 8, 10, 385/39.7, 14.37; 359/285, 237; 272/12

(56) References Cited

U.S. PATENT DOCUMENTS

| | | | |
|---|---|---|---|
| 4,645,293 | * | 2/1987 | Yoshida et al. ................ 385/40 |
| 5,005,932 | * | 4/1991 | Schaffner et al. ............... 385/3 |
| 5,050,948 | * | 9/1991 | Hawkins, II et al. ............ 385/2 |
| 5,233,582 | * | 8/1993 | Tanno et al. .................... 372/12 |
| 5,455,876 | * | 10/1995 | Hopfer et al. .................. 385/2 |

FOREIGN PATENT DOCUMENTS

| | | |
|---|---|---|
| 62-176184 | 8/1987 | (JP) . |
| 1-6446022 | 2/1989 | (JP) . |
| 1-134423 | 5/1989 | (JP) . |
| 2-239896 | 9/1990 | (JP) . |
| 3-296710 | 12/1991 | (JP) . |
| 4-93815 | 3/1992 | (JP) . |
| 4-97118 | 3/1992 | (JP) . |
| 6-250130 | 9/1994 | (JP) . |

OTHER PUBLICATIONS

T. Shintaku; "Higher–Order–Mode–Converted Optical Waveguide Isolator"; Fifth Optoelectronics Conference (OEC '94) Technical Digest, Jul. 1994, Makuhari Messe, pp. 354–355.

* cited by examiner

Primary Examiner—Rodney Bovernick
Assistant Examiner—Ellen E. Kim
(74) Attorney, Agent, or Firm—McGuireWoods, LLP

(57) ABSTRACT

Disclosed is an optical isolator, which has: a medium through which a light transmits and in which a dynamic diffraction grating that periodically repeats a refractive index distribution is formed; wherein the dynamic diffraction grating causes a propagation loss difference between an incident light which is supplied into the medium and a returning light which is supplied into the medium in a direction reverse to the incident light.

5 Claims, 6 Drawing Sheets

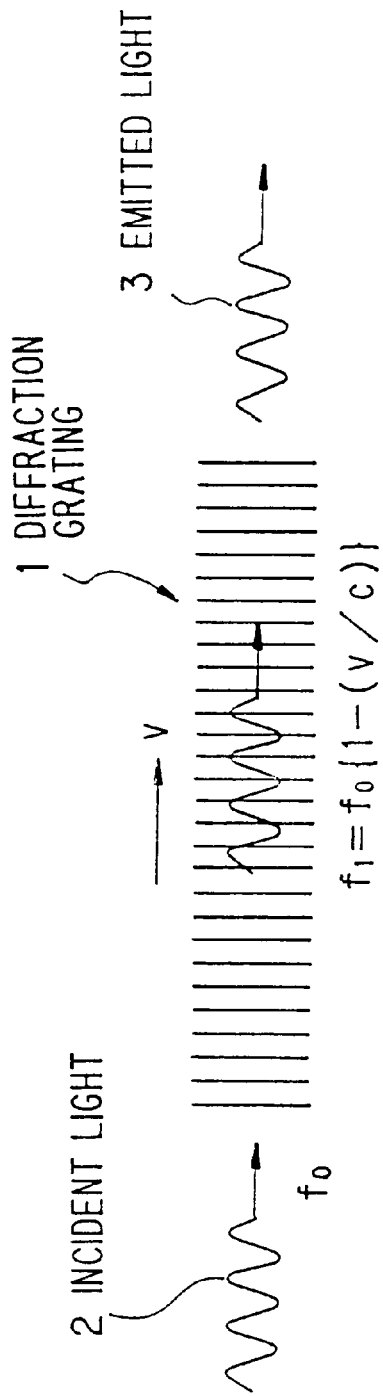
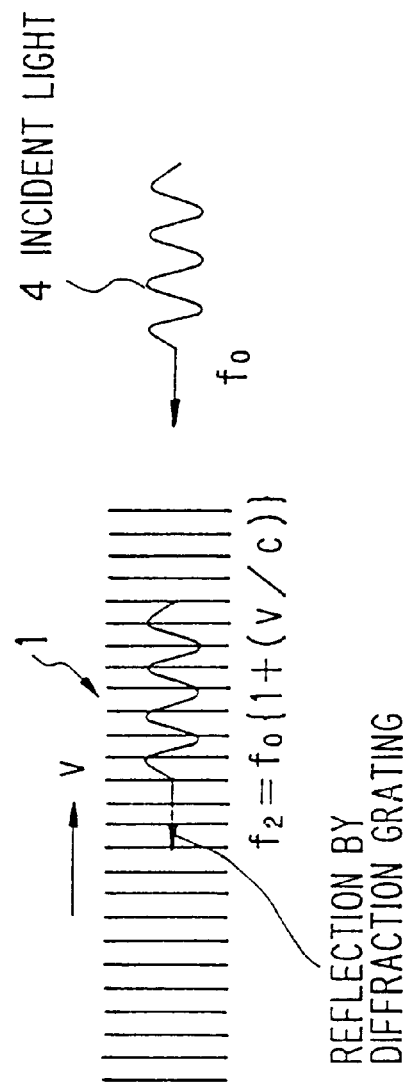
FIG. 1A
FIG. 1B

OPTICAL ISOLATOR

This is a divisional of U.S. patent application Ser. No. 08/848,558, filed Apr. 28, 1997, now U.S. Pat. No. 5,991,481, the contents of which is hereby incorporated by reference.

FIELD OF THE INVENTION

This invention relates to an optical isolator, and more particularly to, an optical waveguide type integrated optical isolator.

BACKGROUND OF THE INVENTION

Semiconductor lasers are widely used as a light source for ultra-high speed and long distance optical fiber communication. However, due to a little reflecting-back light from an optical fiber, there occurs a noise in conventional semiconductor lasers. Because of this, an optical isolator needs to be always used as an optics component for removing the reflecting-back light to the semiconductor laser.

In general, conventional optical isolators comprise a magnetooptic crystal with Faraday effect and two polarizers which are disposed sandwiching the magnetooptic crystal and have polarization planes shifted 45° to each other. In the conventional optical isolators, light emitted from a semiconductor laser is transmitted through the first polarizer, entered into the magnetooptic crystal, where the polarization plane is rotated 45° in a predetermined direction, then transmitted through the second polarizer without being attenuated. On the other hand, reflecting-back light is transmitted through the second polarizer, entered into the magnetooptic crystal, where the polarization plane is further rotated 45° in the predetermined direction. Thereby, the polarization plane of the reflecting-back light is shifted by 90° to the polarization plane of the first polarizer, therefore the first polarizer can prevent the reflecting-back light from entering into the semiconductor laser.

However, in the conventional optical isolators, it is required to prepare at least four elements including a magnet and fabricate them, therefore they are very costly.

Moreover, it is, in fact, difficult for the conventional optical isolator to be monolithically integrated with the semiconductor laser.

SUMMARY OF THE INVENTION

Accordingly, it is an object of the invention to provide an optical isolator whose production cost can be significantly reduced.

It is a further object of the invention to provide an optical isolator which can be monolithically integrated with a semiconductor laser.

According to the invention, an optical isolator, comprises:

a medium through which a light transmits and in which a dynamic diffraction grating that periodically repeats a refractive index distribution is formed;

wherein the dynamic diffraction grating causes a propagation loss difference between an incident light which is supplied into the medium and a returning light which is supplied into the medium in a direction reverse to the incident light.

According to another aspect of the invention, an optical isolator, comprises:

a cylindrical light-transmitting medium in which a periodical refractive index distribution is formed in the direction of a radius of the medium; and means for rotating the cylindrical light-transmitting medium;

wherein an incident light is supplied to a circumferential surface of the cylindrical light-transmitting medium.

Furthermore, according to another aspect of the invention, an optical isolator, comprises:

an optical waveguide into which a light can be led and in which a diffraction grating that is formed as a wave traveling with a periodical refractive index distribution in a predetermined direction is formed;

wherein the diffraction grating causes a propagation loss difference between an incident light which is supplied into the optical waveguide and a returning light which is supplied into the optical waveguide in a direction reverse to the incident light.

Furthermore, according to another aspect of the invention, an optical isolator, comprises:

an optical waveguide composed of a material that can be monolithically with a semiconductor laser;

first and second electrodes which are formed both sides of the optical waveguide;

a terminal resistance which is connected to terminals of the first and second electrodes and is set to match with a characteristic impedance of a line with the first and second electrodes; and a voltage source which applies a high-frequency voltage to opposite ends to the terminals of the first and second electrodes;

wherein an incident light is supplied into the optical waveguide.

Furthermore, according to another aspect of the invention, an optical isolator, comprises:

an optical waveguide with an acoustooptic characteristic;

a comb-like electrode which is formed on the optical waveguide; and a voltage source which applies a high-frequency voltage to the comb-like electrode to induce an ultrasonic wave in the optical waveguide, whereby a diffraction grating that travels with a periodical refractive index variation in a predetermined direction is formed in the optical waveguide;

wherein an incident light is supplied into the optical waveguide.

BRIEF DESCRIPTION OF THE DRAWINGS

The invention will be explained in more detail in conjunction with the appended drawings, wherein:

FIGS. 1A and 1B are illustrations for explaining the principle of the invention.

DESCRIPTION OF THE PREFERRED EMBODIMENTS

Before explaining optical isolators in the preferred embodiments, the principle of the invention will be explained in FIGS. 1A and 1B.

When an incident light 2 with a frequency of $f_0$ is entered into a diffraction grating 1 which is, as shown in FIG. 1A, moving at a relative velocity v in the same direction as the propagation direction of the incident light 2, a frequency of the incident light 2 when observed from the diffraction grating 1 becomes $f_1(=f_0(1-(v/c)))$, where c represents a velocity of light in free space, to be lower than $f_0$, due to Doppler effect.

On the other hand, when the diffraction grating 1 is, as shown in FIG. 1B, moving in the direction reverse to the propagation direction of an incident light 4, a frequency of the incident light 4 when observed from the diffraction grating 1 becomes $f_2(=f_0(1+(v/c)))$ to be higher than $f_0$, due to Doppler effect. Therefore, If the pitch of the diffraction grating 1 is designed to transmit only a light wave with the frequency $f_1$, the light 3 can be, in case of FIG. 1A, emitted from the diffraction grating 1, while the light will be, in case of FIG. 1B, reflected by the diffraction grating 1. Thus, a light-transmitting medium, in which the diffraction grating 1 with a refractive index distribution periodically repeated is formed, can function as an optical isolator when it is moved in a space to cause Doppler effect.

On the other hand, according to another aspect of the invention, an optical isolator, comprises:

an optical waveguide into which a light can be led and in which a diffraction grating that is formed as a wave traveling with a periodical refractive index distribution in a predetermined direction is formed;

wherein the diffraction grating causes a propagation loss difference between an incident light which is supplied into the optical waveguide and a returning light which is supplied into the optical waveguide in a direction reverse to the incident light.

Figure 2:
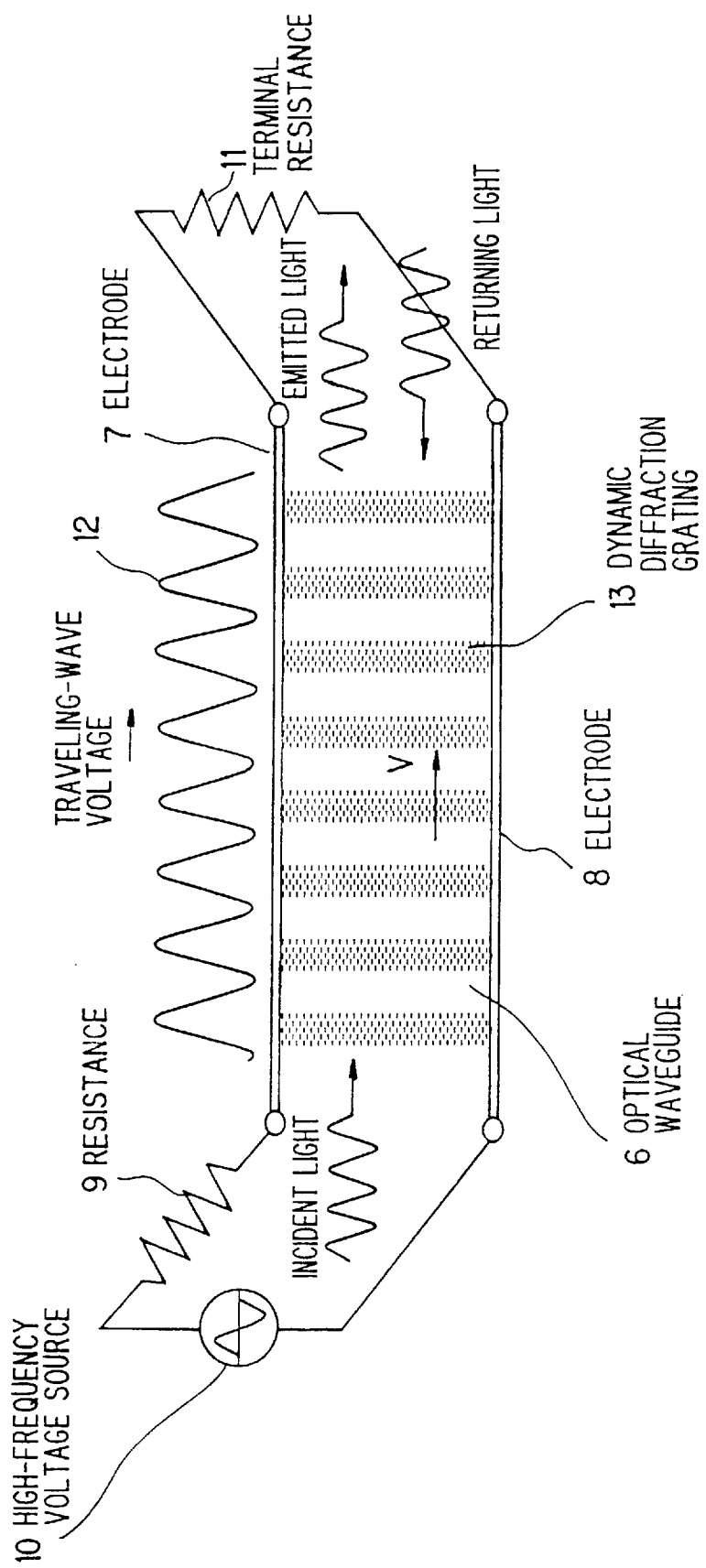
FIG. 2 is an illustration for explaining a detailed theoretical composition of the invention.

FIG. 2 shows a theoretical composition of an optical isolator according to the aspect of the invention. As shown in FIG. 2, this optical isolator comprises an optical waveguide 6 made of an electrooptic material, electrodes 7, 8 formed on both sides of the optical waveguide 6, a high-frequency voltage source 10 connected to terminals of the electrodes 7, 8 through a resistance 9, and a terminal resistance 11 connected to the other terminals of the electrodes 7, 8, where the electrodes 7, 8 are used as a transmission line for a traveling-wave voltage 12.

Figure 3:
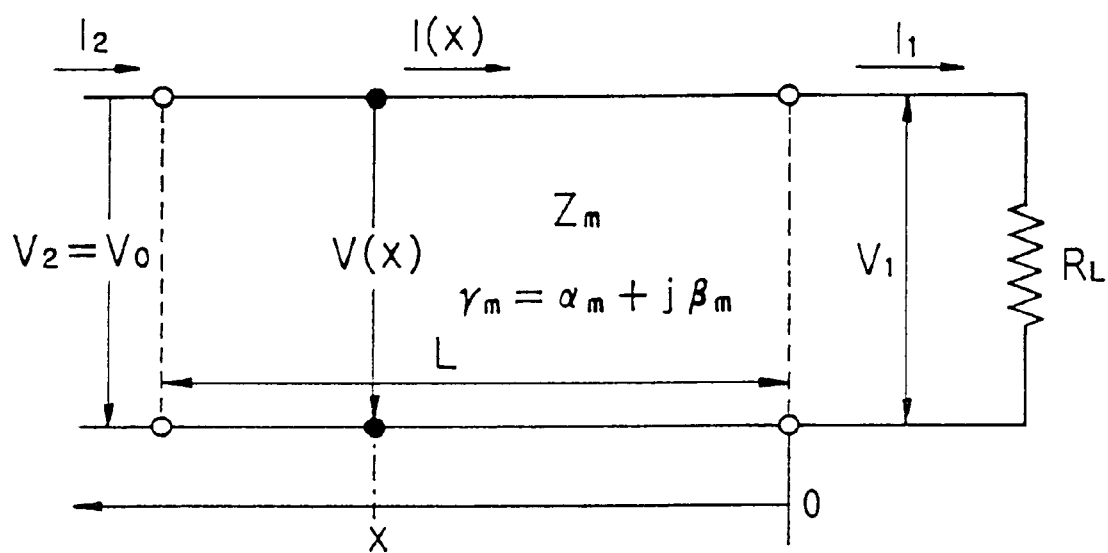
FIG. 3 is an equivalent circuit diagram to the composition in FIG. 2.

FIG. 3 is an equivalent circuit of the composition in FIG. 2, where $Z_m$ and $Z_L$ are a characteristic impedance and a terminal resistance, respectively when regarded as a distributed constant circuit, and $\gamma_m$ is a propagation constant given by:

$$\gamma_m = \alpha_m + j\beta_m \tag{1}$$

where $\alpha_m$ is an attenuation constant and $\beta_m$ is a phase constant. $V_1$ and $I_1$ are a voltage and a current, respectively at the terminal, and $V_2$ and $I_2$ are a voltage and a current, respectively at the incident end. A device length is L, and x represents a distance from the terminal resistance $R_L$(corresponding to 11 in FIG. 2).

From the basic equation as to voltage and current of a distributed constant circuit, a voltage at an optional position x on the distributed constant circuit, V(x) is, using the incident end voltage $V_2 = V_g$, given by:

$$V(x) = \frac{V_g}{(R_L + Z_m)e^{\gamma_m L} + (R_L - Z_m) - e^{\gamma_m L}}[(R_L + Z_m)e^{\gamma_m x} + (R_L - Z_m)e^{-\gamma_m x}] \tag{2}$$

If $V_g$ is the sine function of an angular frequency ω, the phase constant $\beta_m$ of the propagation constant $\gamma_m$ is given by:

$$\beta_m = (\omega/c)n_m = \omega/v_m \tag{3}$$

where c is the propagation velocity of an electromagnetic wave in a free space and $n_m$ is an effective refractive index to the voltage wave.

The first term on the right side of equation (2) represents a voltage wave traveling from the incident end to the terminal. The second term on the right side of equation (2) is considered as a voltage pulse traveling from the terminal to the incident end, i.e., reflecting wave. As seen from equation (2), if the terminal resistance $R_L$ is set to be equal to the characteristic impedance $z_m$, the impedance matching can be completely obtained, therefore there occurs no reflecting wave at the terminal. In this case, the voltage distribution is given by:

$$V(x) = V_g e^{-\gamma_m(L-x)} \tag{4}$$

Namely, only the traveling-wave voltage from the incident end from the terminal can be obtained.

By supplying such traveling-wave voltage 12, a dynamic diffraction grating 13 that a wave with the refractive index variation of the material moves at a high velocity can be formed in the optical waveguide 6. Further, utilizing Doppler effect as shown in FIG. 1, it can be operated as an optical isolator.

Next, an optical isolator in the first preferred embodiment will be explained in FIG. 4.

Figure 4:
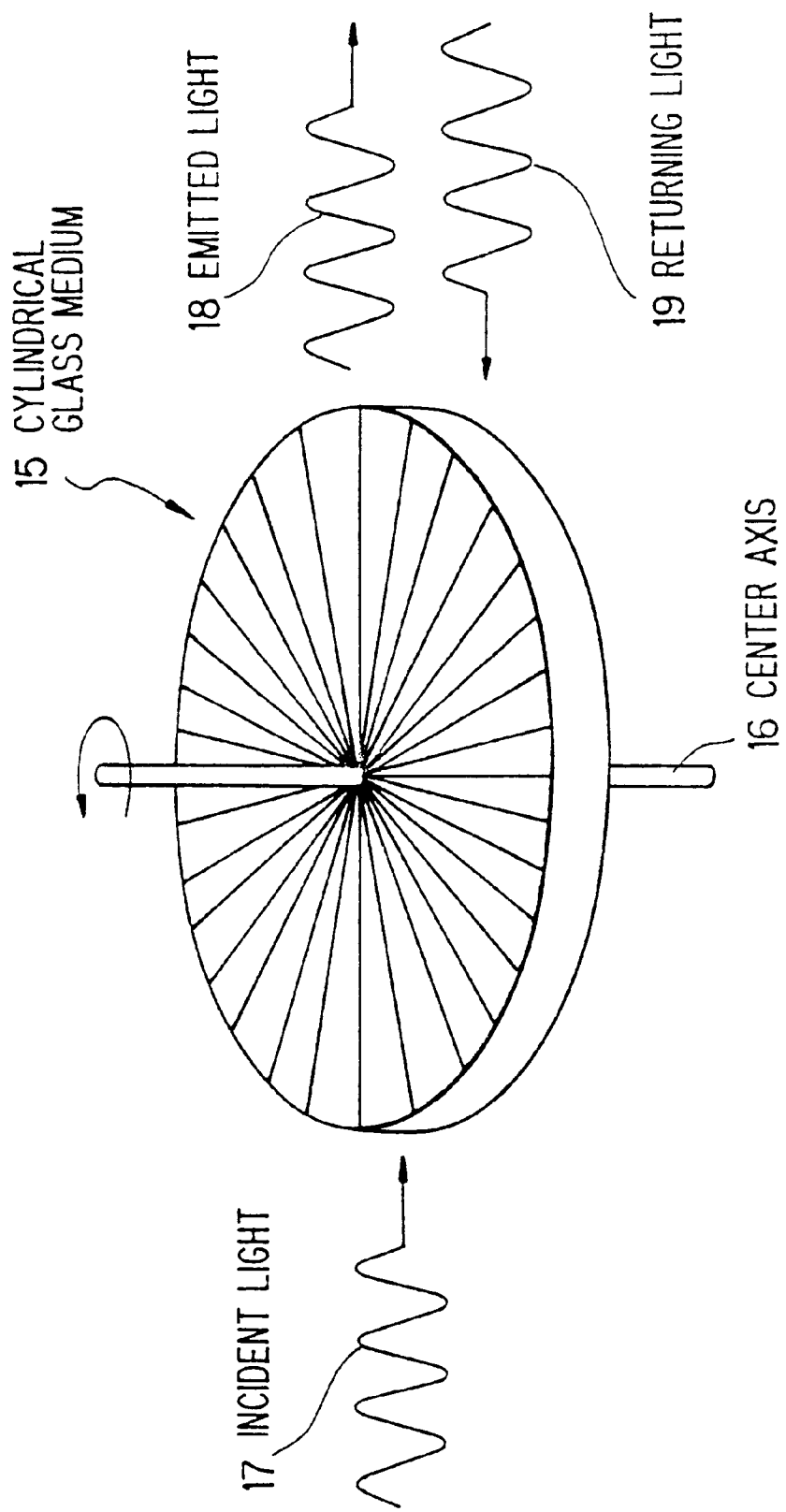
FIG. 4 is a schematic perspective view showing an optical isolator in a first preferred embodiment according to the invention.

As shown in FIG. 4, a cylindrical glass medium 15 has different refractive index distribution regions formed periodically in the radius direction to periodically change the refractive index distribution. This glass medium 15 is provided with a center axis 16 penetrating through and fixing at its center, and it is rotated at a high velocity in the direction shown by an arrow in FIG. 4.

When an incident light 17 is supplied onto the side wall of the glass medium 15 from one side of the glass medium 15 which is turning at the high velocity, the glass medium 15 functions as a diffraction grating that moves at the high velocity in the glass medium 15 in the same direction as the propagation direction of the incident light 17. Thus, due to Doppler effect, only the incident light with a certain frequency can be, as explained in FIG. 1, emitted as an emitted light 18. Also, a returning light 19 cannot be transmitted through the glass medium 15.

Here, to get a shift amount of frequency, $\Delta f = |f_1 - f_2| = f_0/1000$ in the incident light 17 based on Doppler effect, a moving velocity more than $1.5 \times 10^5$ m/s of the diffraction grating is required in view of the aforementioned equations, $f_1 = f_0(1-(v/c))$ and $f_2 = f_0(1+(v/c))$. Thus, if the radius of the glass medium 15 is 10 mm, the rotation velocity required is about $2.4 \times 10^6/\text{s} (=1.5 \times 10^5/(2 \times \pi \times 10 \times 10^{31\ 3}))$.

By supplying a light into the high-speed rotating cylindrical glass medium 15, about 20 dB isolation can be obtained. Meanwhile, since the cylindrical glass medium 15 can have different linear velocities depending on radius positions even when having the same rotation velocity, i.e., the moving velocity v of the diffraction grating can be changed depending on the incidence position of the incident light 17 to the glass medium 15, a frequency that a light wave can transmit can be changed by varying the incidence position of the incident light 17 to the glass medium 15.

As described above, in the first embodiment, without using conventional materials with an non-reciprocal optical effect such as a magnetooptic effect, magnet etc., an optical isolator can be composed of standard semiconductor materials.

An optical isolator in the second preferred embodiment will be explained in FIG. 5.

Figure 5:
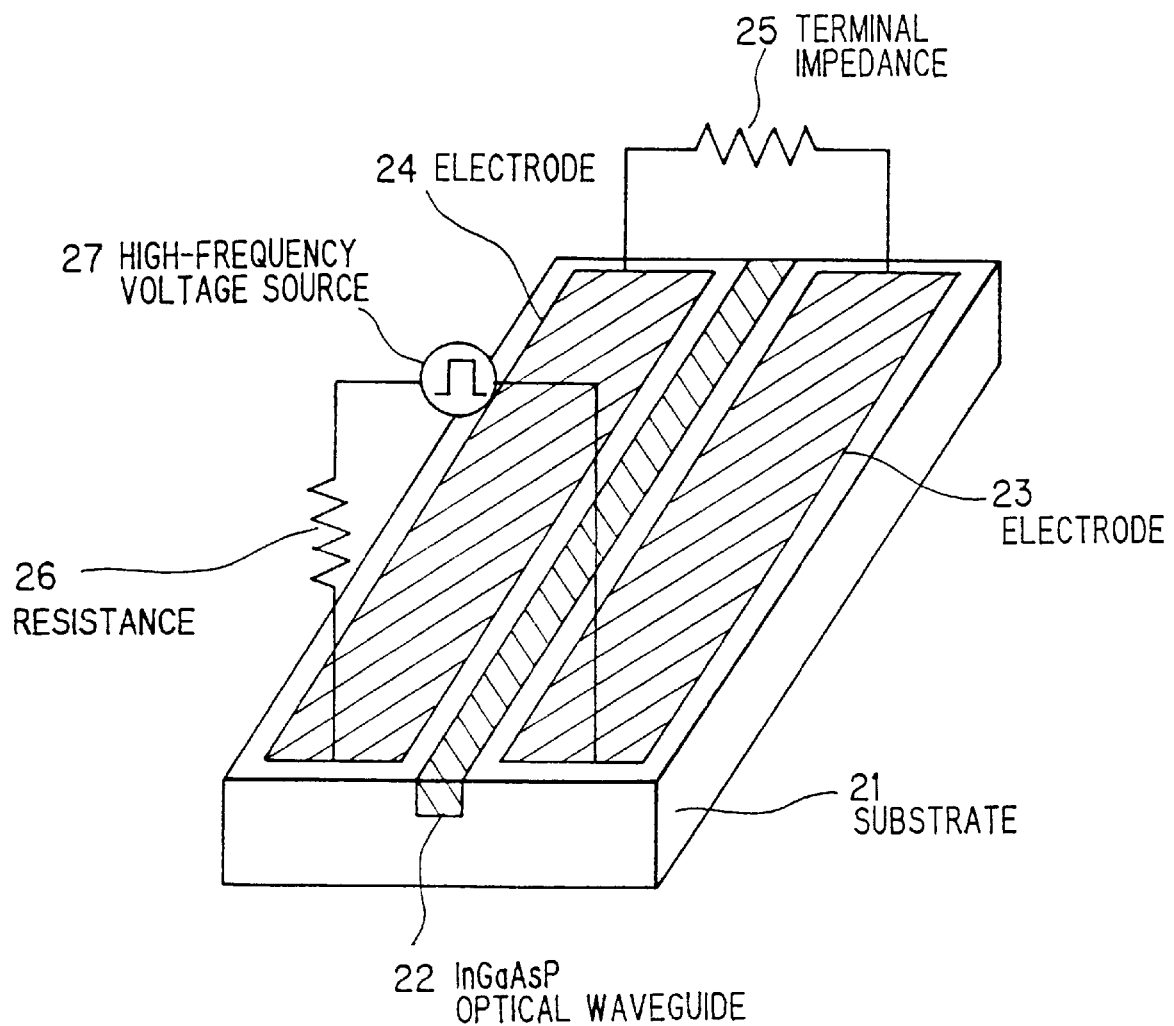
FIG. 5 is a schematic perspective view showing an optical isolator in a second preferred embodiment according to the invention.

As shown in FIG. 5, a 0.2 $\mu$m thick InGaAsP four-element layer is grown on a substrate 21 composed of InP that can be monolithically integrated with a long wavelength semiconductor laser, then, by a standard photolithography and etching, a 3 $\mu$m wide ridge-stripe optical waveguide 22 is formed. Further, both sides of the optical waveguide 22 are buried by growing InP. Then, electrodes 23, 24 are vapor-deposited on both sides of the ridge-stripe optical waveguide 22.

The device length L is set to be about 1 mm, thereby the characteristic impedance $Z_m$ of about 50Ω can be obtained. Though a large isolation characteristic can be, of course, obtained by increasing the device length L, the waveguide loss will be increased. In this embodiment, a terminal impedance of 50Ω is connected to the terminals of the electrodes 23, 24 to match the characteristic impedance $Z_m$. To the other ends of the electrodes 23, 24, a resistance 26 and a high-frequency voltage source 27 are connected in series.

In the second embodiment, according to the operational principle as explained with reference to FIGS. 2 and 3, only the traveling-wave voltage from the incidence ends of the electrodes 23, 24(corresponding to the electrodes 7, 8 in FIG. 2) to the terminal can be obtained, and a dynamic diffraction grating that a wave with the refractive index variation of the material moves at a high velocity can be formed in the optical waveguide 22. Thus, when a light wave with a frequency of $f_0$ is supplied into the incidence end of the optical waveguide 22, due to Doppler effect, only the light wave with a frequency of $f_1$ can be transmitted through, and the returning light with a predetermined frequency of $f_2$ can be removed.

Here, in case of using InP materials with a dielectric constant of 12.4, the moving velocity of the dynamic diffraction grating is about 0.39 c. Thereby, the frequencies $f_1$, $f_2$ become 0.61 $f_0$ and 1.39 $f_0$, respectively. In this case, to an incident light with a wavelength of 1.3 $\mu$m, the pitch of the dynamic diffraction grating that a light with a wavelength of $f_1$ can be transmitted through and a light with a wavelength of $f_2$ can be removed from is about 1500 Å. Therefore, the frequency of the injected traveling voltage wave output from the high-frequency voltage source 27 is set to be $7 \times 10^{14}$ Hz.

As described above, in the second embodiment, without using conventional materials with an non-reciprocal optical effect such as a magnetooptic effect, magnet etc., an optical isolator can be composed of standard semiconductor materials. Also, it can be monolithically integrated with a semiconductor laser, thereby the cost of an optical module requiring an optical isolator can be significantly reduced.

Though the optical isolator in the second embodiment is applied to an incident light with a wavelength of 1.3 $\mu$m, an optical isolator in the second embodiment may be also monolithically integrated with a semiconductor laser with a wavelength of 1.5 $\mu$m by adjusting the frequency of the high-frequency voltage source 27.

An optical isolator in the third preferred embodiment will be explained in FIGS. 6A and 6B.

Figure 6A:
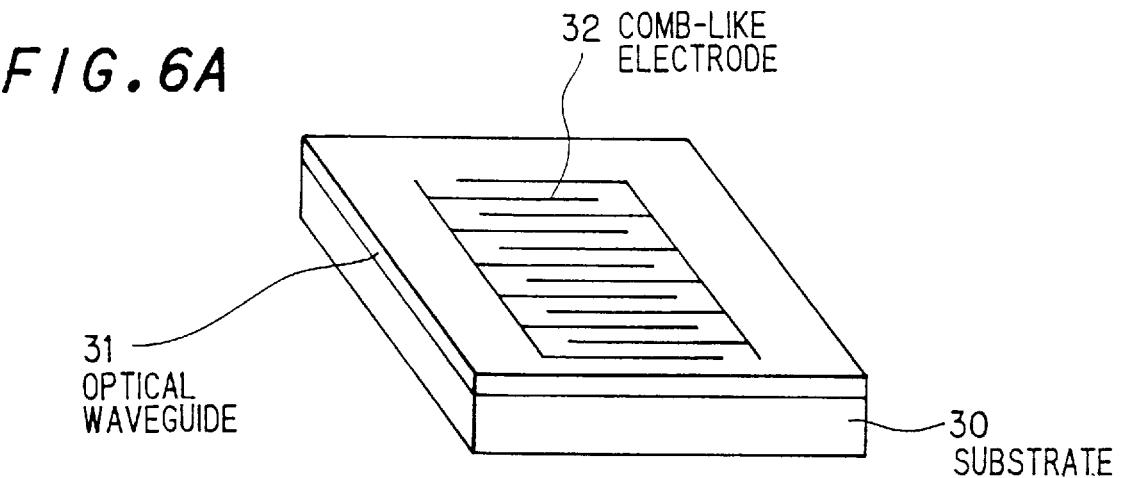
FIG. 6A is a schematic perspective view showing an optical isolator in a third preferred embodiment according to the invention.

As shown in FIG. 6A, the optical isolator in the third embodiment comprises an optical waveguide 31 formed on a substrate 30 which is composed of a medium with an acoustooptic characteristic, such as LiIO3, LiNbO3, and a comb-like electrode 32 formed on the optical waveguide 31. A high-frequency voltage is applied to the comb-like electrode 32 from a high-frequency voltage source(not shown).

Figure 6B:
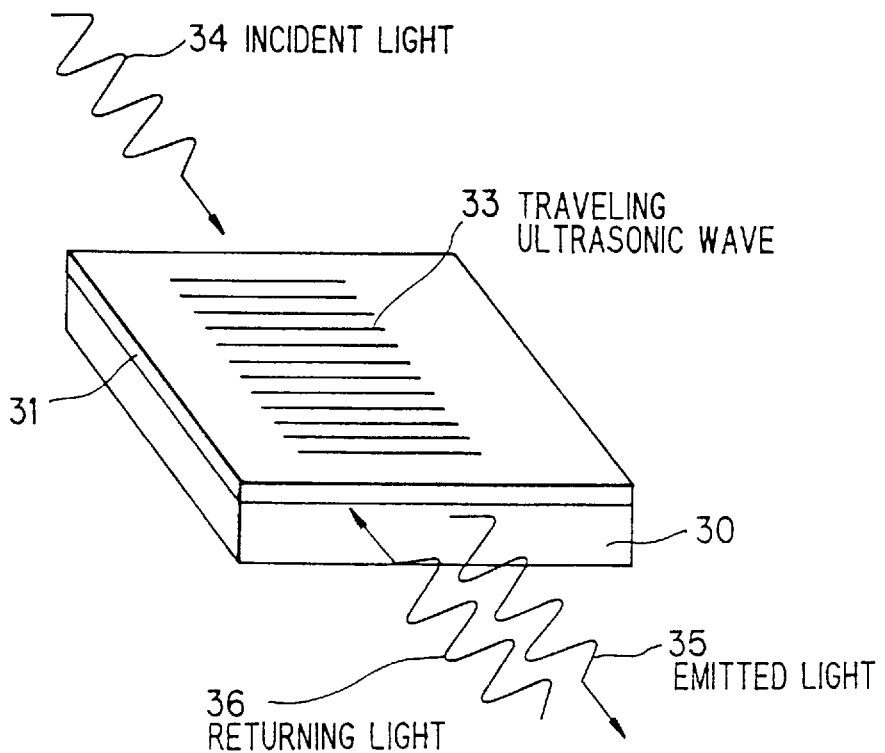
FIG. 6B is a schematic perspective view for explaining an operation of the optical isolator in FIG. 6A.

In the third embodiment, by the high-frequency voltage, a traveling ultrasonic wave 33 is, as shown in FIG. 6B, induced in the optical waveguide 31 as the acoustooptic medium, whereby a dynamic diffraction grating that a refractive index is periodically varied and moved in a specific direction can be formed in the optical waveguide 31.

When an incident light 34 is supplied into the diffraction grating, due to Doppler effect, only a light wave 35 with a predetermined frequency of $f_1$ can be transmitted through, and a returning light 36 with a predetermined frequency of $f_2$ can be removed from. Thus, it can function as an optical isolator. Also in the third embodiment, without using conventional materials with an non-reciprocal optical effect such as a magnetooptic effect, magnet etc., an optical isolator can be composed of standard semiconductor materials.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical isolator, comprising:
    an optical waveguide;
    first and second electrodes which are formed on both sides of said optical waveguide;
    a terminal resistance which is connected to terminal ends of said first and second electrodes and is set to match a predetermined characteristic impedance; and
    a voltage source which applies a high-frequency voltage to incident ends of said first and second electrodes, said high-frequency voltage creating a moving diffraction grating in said optical waveguide having a pitch which causes said grating to transmit incident light of only a predetermined frequency and to reflect light of a frequency different from said predetermined frequency supplied to said diffraction grating in a direction reverse to said incident light.

2. An optical isolator, comprising:
    an optical waveguide including an acoustooptic medium;
    a comb-like electrode which is formed on said optical waveguide; and
    a voltage source which applies a high-frequency voltage to said comb-like electrode to induce an ultrasonic wave in said optical waveguide, whereby a diffraction grating that travels with a periodical refractive index variation in a predetermined direction is formed in said optical waveguide, said diffraction grating having a pitch which causes said grating to transmit incident light of only a predetermined frequency and to reflect light of a frequency different from said predetermined frequency supplied to said diffraction grating in a direction reverse to said incident light, wherein said grating transmits said incident light of only said predetermined frequency without reflecting substantially any portion of said incident light at said predetermined frequency.

3. The optical isolator of claim 2, wherein said optical waveguide functions as an optical isolator as a result of said diffraction grating.

4. An optical isolator comprising:

an optical waveguide;

first and second electrodes which are formed on both sides of said optical waveguide;

a terminal resistance which is connected to terminal ends of said first and second electrodes and is set to match a predetermined characteristic impedance; and a voltage source which applies a high-frequency voltage to incident ends of said first and second electrodes, said high-frequency voltage creating a moving diffraction grating in said optical waveguide having a pitch which causes said grating to transmit incident light of only a predetermined frequency and to reflect light of a frequency different from said predetermined frequency supplied to said diffraction grating in a direction reverse to said incident light, wherein said optical waveguide includes a material that is monolithically integrated with a semiconductor laser.

5. The optical isolator of claim 4, wherein monolithic integration of said material with said semiconductor laser is achieved by adjusting a frequency of said high-frequency voltage.

* * * * *

UNITED STATES PATENT AND TRADEMARK OFFICE
CERTIFICATE OF CORRECTION

PATENT NO. : 6,226,427 B1
DATED : May 1, 2001
INVENTOR(S) : Yidong Huang

It is certified that error appears in the above-identified patent and that said Letters Patent is hereby corrected as shown below:

<u>Title page,</u>
Under Inventor, change "Nuang" to read -- Huang --.

Signed and Sealed this

Eighth Day of January, 2002

Attest:

JAMES E. ROGAN
Attesting Officer  Director of the United States Patent and Trademark Office